United States Patent
Polk, Jr. et al.

(10) Patent No.: US 6,892,339 B1
(45) Date of Patent: May 10, 2005

(54) DISCRETE MULTI-TONE (DMT) SYSTEM AND METHOD THAT COMMUNICATES A DATA PUMP DATA STREAM BETWEEN A GENERAL PURPOSE CPU AND A DSP VIA A BUFFERING SCHEME

(75) Inventors: Charles E. Polk, Jr., Athens, AL (US); Lee T. Gusler, Madison, AL (US); Patrick J. Quirk, Huntsville, AL (US); Ronald M. Zuckerman, Madison, AL (US); Joe L. Wilson, Jr., Madison, AL (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 09/398,707

(22) Filed: Sep. 20, 1999

(51) Int. Cl.[7] .......................... G06F 11/00; G06F 11/30; G08C 25/00; H03M 13/00; H04L 1/00
(52) U.S. Cl. ...................................... 714/746; 714/758
(58) Field of Search ................................. 714/746, 758, 714/776; 718/100, 107, 104; 340/7.21; 370/241, 294; 710/22; 360/40, 46, 65, 51; 375/222

(56) References Cited

U.S. PATENT DOCUMENTS

| | | | | |
|---|---|---|---|---|
| 5,404,522 A | * | 4/1995 | Carmon et al. | 718/107 |
| 5,724,587 A | * | 3/1998 | Carmon et al. | 718/104 |
| 5,825,570 A | * | 10/1998 | Kanegae et al. | 360/65 |
| 6,480,475 B1 | * | 11/2002 | Modlin et al. | 370/294 |
| 6,501,791 B1 | * | 12/2002 | Hwang | 375/222 |

* cited by examiner

Primary Examiner—Albert Decady
Assistant Examiner—Mujtaba Chaudry (57) ABSTRACT

The apparatus and method herein splits the function of a digital subscriber line (DSL) modem data pump between a digital signal processor (DSP 106) and a general purpose host central processing unit (CPU 102). The DSP (106) handles all front end data pump processing such as interface to an analog front end (108 and 110), FFT processing, FEQ processing, QAM decoding, and bit formatting. The host CPU (102) handles all back end data pump processing such as DMT tone deordering, data deinterleaving, error detection and correcting, bit descrambling, CRC processing, and the like. In order to enable the DSP (106) and the CPU (102) to communicate with each other effectively, buffers (132) under the control of specialized buffer management methodology (FIG. 4) are used.

14 Claims, 4 Drawing Sheets

|   | HOST | DSP | |
|---|------|-----|---|
| 0–T | SENDS SYMBOLS A–C IN A BURST OVER PCI BUS | QUEUES A, B, C IN INCOMING DATA BUFFER | C<br>B<br>A |
| T–2T | X | QUEUES A, B, C IN INCOMING DATA BUFFER | X<br>C<br>B |
| 2T–3T | X | QUEUES A, B, C IN INCOMING DATA BUFFER | X<br>X<br>C |
| 3T–4T | SEND SYMBOL D | QUEUES A, B, C IN INCOMING DATA BUFFER | X<br>X<br>D |
| 4T–5T | X | SEND SYMBOL D | X<br>X<br>X |
| 5T–6T | X | RESEND SYMBOL D, INCREMENT COUNTER TO 1 | X<br>X<br>X |
| 6T–7T | SEND SYMBOLS E, F, G | RESEND SYMBOL D, QUEUE SYMBOLS E, F, G, INCREMENT COUNTER TO 2 | G<br>F<br>E |
| 7T–8T | SEND SYMBOLS H, I | THROW AWAY E AND F BASED ON COUNTER AND SEND SYMBOL G, QUEUE SYMBOLS H AND G | <br>I<br>H |

*FIG. 4*

DISCRETE MULTI-TONE (DMT) SYSTEM AND METHOD THAT COMMUNICATES A DATA PUMP DATA STREAM BETWEEN A GENERAL PURPOSE CPU AND A DSP VIA A BUFFERING SCHEME

FIELD OF THE INVENTION

The present invention relates generally to DMT telecommunication systems, and more particularly to parsing the data pump processing of multi-tone (multi-carrier) systems between two different processing engines where buffering of communicated data between the two different processing engines is utilized.

BACKGROUND OF THE INVENTION

Most computer consumers are urging the industry to provide an increase in the rate of data communication (e.g., Internet, WANs, LANs, token ring, etc.) over conventional communication media (e.g., copper wire, cable, wireless, etc.). Yet, the personal computer (PC) market and the PC consumer will generally not accept an increase in performance at the expense of a severe increase in system cost. Therefore, it is advantageous for the cost of newly designed data communication systems (e.g., ADSL modems, cable modems, wireless systems, V.90 modems and the like) to remain flat or even decrease over time while simultaneously accommodating improved performance.

Historically, the modem integrated circuit (IC) industry has responded to the desire for enhanced performance by designing and manufacturing much more complex digital signal processors (DSPs) that can provide more MIPS (millions of instructions per second) or use by modem algorithms. While these faster and more complex DSP ICs may significantly enhance performance, many of these new DSP products are too expensive or too power-intensive to use within the sub-$1000 PC market or within the growing number of low-cost, low-power, embedded or hand-held modem systems. In short, the market will not accept incrementally adding up to several hundred dollars in modem DSP hardware to a PC or hand-held device where such addition increases the overall cost of these devices by 20% or more. Furthermore, many older, low-cost, existing DSPs simply do not have the MIPS capability to perform all the requisite data pump functions needed in modern DMT modem systems.

Therefore, it has been very difficult to offer the consumer increased data communication rates at reduced costs when using conventional modem architectures that execute all modem operations on a DSP engine.

Some systems have opted to entirely eliminate the DSP from the modem solution to reduce cost. These systems, referred to as "soft modems", are simply a collection of software functions or algorithms that are placed into the general purpose global memory of a PC and executed entirely on the host processor of the PC (e.g., PowerPC™ 604 or Pentium™II). Many of these "soft modem" solutions are being provided to the market at a price that is cheaper than the base manufacturing costs of many modern DSPs. However, the soft modem solution consumes a significant portion of the MIPS of the host processor, whereby the host processor is generally too busy processing incoming data to quickly perform real-time tasks for the current computer user. Therefore, while the soft modem is a significant advance and very useful in some applications, it is not a viable solution for every consumer in all situations.

Therefore, a need exists in the industry for a system that provides adequate high-end performance (e.g., enough performance to more efficiently implement higher rate communication protocols like asymmetric digital subscriber line (ADSL), cable modem, and G.lite implementations), at a cost that is attractive to consumers, in a flexible manner, without consuming user-noticeable amounts of host CPU processing power.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Generally, FIGS. 1–4 teach a system and method for splitting the data pump processing for a Discrete Multi-Tone (DMT) system or a like data communication modem between two processors. In FIGS. 1–4, the data pump processing is shared between a general purpose central processing unit (CPU) of a personal computer (PC) or hand-held device (e.g., PowerPC™ 604, Pentium™ II, MC68332, or other host CPU) and a modem digital signal processor (DSP) (e.g., a 56303 Onyx DSP or like execution engine). By splitting the MIPS required to perform data pump operations between a host CPU and a dedicated DSP, the DSP selected in the design need not have a complex design or a costly architecture in order to provide high performance. A DSP with lower MIPS capability may be utilized while still providing state-of-the-art advanced performance levels at a fraction of the cost of using the newer higher-performance DSP ICs. Further, a moderate to insignificant amount of the total MIPS of the host CPU are consumed by this shared data pump processing so that the added tasks performed by the host CPU either do not affect PC performance or are negligible in most cases. In addition, the percentage of work load sharing between the DSP and the host processor may be set by a user via software or may be dynamically set by the host processor as it's MIPS demands change so that the MIPS consumed in the host processor is adjustable to different computer environment demands. Since the host CPU is a cost that must be present within the PC, it's use to defray DSP MIPS by taking on portions of the data pump flow for modem operations will decrease the costs of the modem solution.

In addition, since the host CPU is generally performing the memory-intensive digital symbol rate processing and the DSP is generally performing the fast Fourier transform (FFT) processing and like computationally intensive tasks on the incoming bit stream, data packets or digital time domain data streams are passed between the host CPU and the DSP along some bus architecture, such as peripheral component interconnect (PCI). Generally, G.lite, ATM, ADSL, or other protocols require that the communication of data between a receiver and a transmitter along the communication line be uninterrupted and continuous. Since the host's MIPS are also consumed by other processing, circumstances may arise where the host CPU cannot feed the DSP symbol data at a fast enough rate to ensure that the DSP can continually process new data symbols along the analog communication line. In these circumstances, most systems would simply cease the transmission for a short period of time until more data is provided, and then retrain and reestablish the connection at a later time once more valid data symbols are ready for processing. Such a solution is not optimal in all applications. In some applications, if the DSP has no new symbols to transmit, the DSP herein retransmits the last valid ADSL or G.lite symbol it was given via the host CPU as a redundant symbol. If necessary, the DSP will transmit that last symbol N serial and incremental times as N redundant symbols, where N is an integer greater than 1, until one or more new symbols are provided from the host to the DSP. Once one or more new symbols are provided, the first N symbols provided from the host are discarded and the transmission continues in the symbol stream where it would have been had all that discarded data been timely provided to the DSP and transmitted over the communication line.

In a real time data communication, such as music or a video conference operations, the discarded symbols are simply lost and will generally not be requested for retransmission. If requested for retransmission by a higher level in the telecommunication protocol, such a transmission will be made, but likely not used by the receiving end. The result is that the video conference or real time music may experience a slight discontinuity or glitch. However, in many cases, a loss of a few milliseconds of data will not be noticed by a human user. Even losses of noticeable fractions of a second in a real time transmission is better than a total loss of the transmission capability altogether. In the case of non-real time data, such as the transmission of HTML web page content, a software download, or GIF pictures, the "lost" data symbols discarded by the DSP will be detected by higher levels of the protocol and such content will be resent to the receiver via prompts from a higher level of the protocols and properly reassembled with the data.

The dual processor data pump implementation and data buffering may be better understood with specific reference to FIGS. 1–4 herein below.

Figure 1:
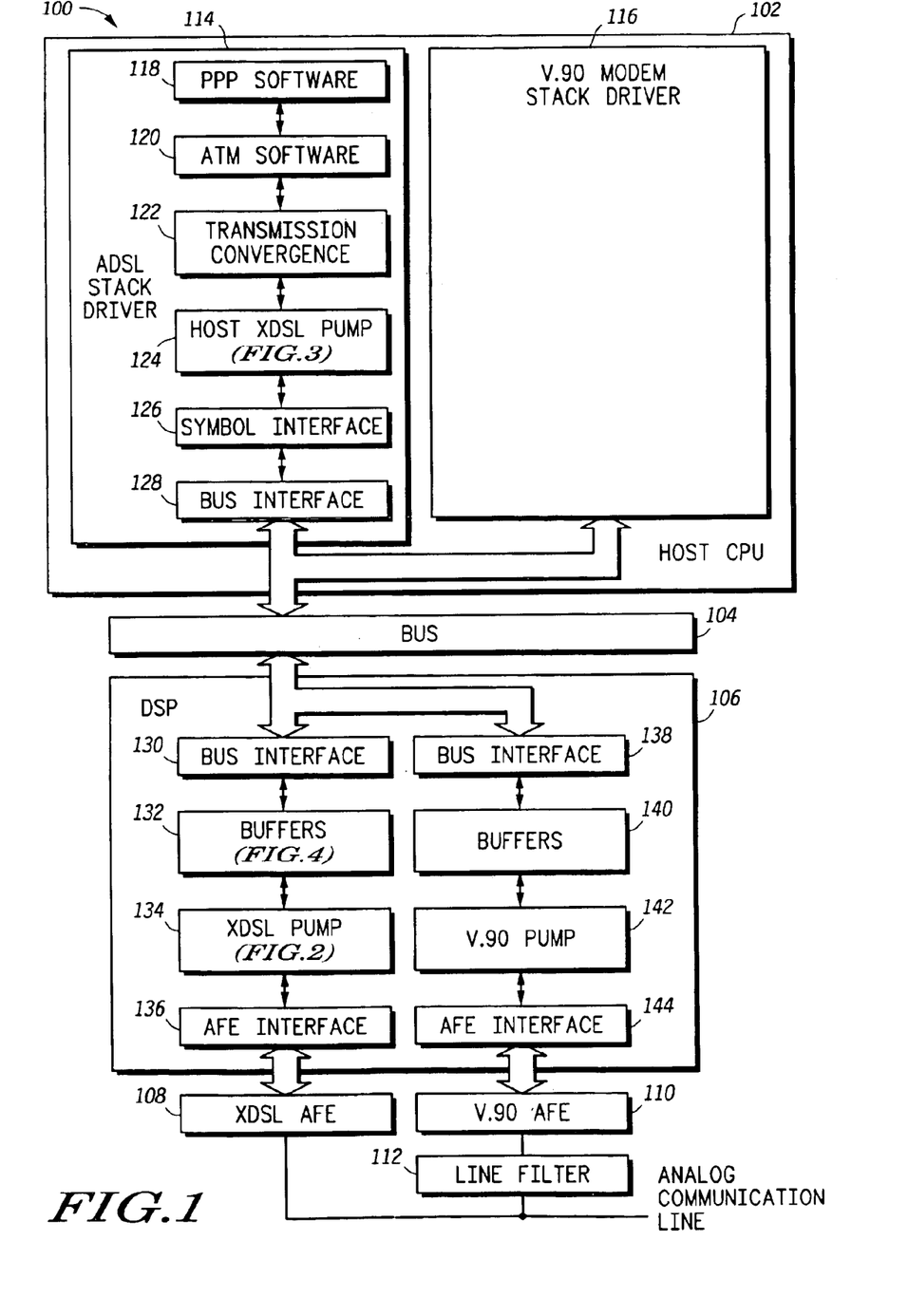
FIG. 1 illustrates, in a block diagram, a modem architecture that accommodates V.90 communication as well as one of either ADSL or G.lite communication by splitting data pump functionality between the host CPU and a competitively-priced DSP.

FIG. 1 illustrates a DMT and/or V.90 modem architecture 100 which uses two segmented processing units. A first processing unit is the general purpose CPU or host CPU 102 that resides within a personal computer (PC) system and is subject to a PC operating system such as Apple's MacOS 8 or Microsoft's Windows NT. The second CPU is a DSP 106 that is dedicated to performing modem communication processing. The DSP and the CPU are coupled to each other via a bus 104. The bus generally contains address lines, data lines, and one or more control lines to allow address, data, and/or program information to be communicated between the DSP 106 and the host CPU 102. The bus 104 may be a PC bus architecture such as a PCI bus. Common memory (e.g., DRAM, SRAM, nonvolatile, EEPROM, and the like) that is shared by the DSP and the host CPU is also coupled to the bus but not specifically shown in FIG. 1. In addition, the DSP, host CPU, bus interconnections, and memory may be embedded on a single integrated IC solution or a multi-chip module (MCM), or the DSP and host CPU may be formed as separately packaged devices.

Generally, data is communicated to and from the PC using one or more analog communication lines shown in FIG. 1. The analog communication line couples through an xDSL analog front end (AFE) 108 and is coupled in parallel through a line filter 112 and a V.90 AFE 110. When the PC is configured to send or receive ADSL, G.lite, or like information, the xDSL AFE 108 is used by the PC. When the PC is configured to send or receive V.90, K56FLEX, X2, V.34, or like data, the V.90 AFE 110 is used as an I/O channel. The line filter 112, which is generally an inductor or some other combinational LCR circuit, is present to prevent excessive noise from an ADSL transmission from affecting the V.90 circuitry.

When one or more AFEs are enabled in FIG. 1, the AFEs perform various analog operations on the incoming analog data stream. Typically, an AFE device will filter the incoming analog data stream by at least a low pass filter, and more likely a band pass IIR filter, in order to remove some unused or undesirable frequency spectrum from the signal to accommodate subsequent DSP processing. An AFE may also time domain equalize (TEQ) the analog communication line for performance purposes via an FIR filter or like circuit. The AFE usually contains analog-to-digital (A/D) and/or digital-to-analog (D/A) circuits that allow the digital environment of the PC to interface effectively with the analog environment of the worldwide telecommunications infrastructure. Generally, the AFEs perform various analog operations needed to process incoming and outgoing data between the analog and digital domains.

The DSP 106 interfaces to the AFEs 108 and 110 via one or more AFE interfaces 136 and 144. The xDSL pump routines 134 of FIG. 1 perform all the serial bit stream digital processing on the incoming digital data stream provided by the AFE 108 in order to process time domain bit streams into packets or symbols of DSL digital information. The same is true for the V.90 pump 142, except that this pump 142 will be used to process V.90 digital data instead of DSL information. Generally, the pumps 134 and 142 provide one or more of AGC (Automatic Gain Control), timing and synchronization to the incoming data stream, equalization (EQ), QAM modulation/demodulation, FFT and/or IFFT processing, slicing operations related to quadrature amplitude modulation (QAM) coding, trellis coding/decoding, constellation encode/decode operations, signal to noise ratio (SNR) monitoring, formatting of bits for presentation to the host CPU, and/or like processing. The specifics of the xDSL pump operations 134 are discussed with respect to subsequent FIG. 2 herein.

The buffers 132 are used to store N symbols or N sets of several bits of information occasionally received from the host CPU 102 to the DSP 106. The data in the buffer 132 is preferably stored in a first in first out (FIFO) manner. The buffer 132 is used in an attempt to ensure that the DSP has access to a continuous stream of valid and timely data so that ADSL transmitting operations are not interrupted or complicated. The specific operation of the buffer 132 is illustrated and discussed with respect to FIG. 4 herein. Symbols or a plurality of bits communicated from the host CPU 102 to the DSP 106, as well as the communication of symbol information from the DSP to the host CPU, are performed through the bus interface unit (BIU) 130. Note that the units 138–144 are analogous to the units 130–136 except that the units 138–144 are used for V.90 or other purposes.

Therefore, the DSP performs a significant portion of the digital processing just before data is sent to the AFE (in the case of transmitted data) and performs a significant amount of digital processing just after the data is received by the AFE (in the case of received data). In essence, the DSP 106 is responsible for converting back and forth between serial streams of time domain data and parallel-provided ADSL symbols or packets.

When the CPU 102 is sending data external to the PC on the analog communication line or when the CPU 102 is to receive data from the analog communication line, one of either the ADSL stack driver or the V.90 modem stack driver is used. When data is being sent by the CPU over the analog communication line, the CPU 102 converts the data into TCP/IP form and PPP processes the data per a step 118. The data is then packaged into an asynchronous transfer mode (ATM) format per the step 120. The transmission convergence (TC) layer 122 is present to synchronize the asynchronous ATM cells to the synchronous ADSL transmission mechanism by inserting idle ATM cells if necessary or otherwise processing the data stream to accommodate alignment of ATM to ADSL/G.lite.

After the step 122, the host xDSL pump 124 processes the ATM cells into digital ADSL symbols for subsequent processing and transmission via the DSP 106. Generally, the host xDSL pump 124 performs one or more data processing operations, such as ADSL frequency bin bit ordering or deordering, data interleaving or deinterleaving, forward error correction (FEC) Reed Solomon (RS) encoding or decoding, bit descrambling, cyclic redundancy check (CRC) processing, multiplexing, demultiplexing, and/or the like. The specific details of the pump 124 are discussed subsequently with respect to FIG. 3.

The buffers 126 may be used to buffer incoming symbols into the CPU 102 or outgoing symbols out from the CPU 102. Incoming symbols are buffered so that the processor 102 need not be immediately interrupted to handle incoming data if a higher priority time-consuming process is currently being acted upon by the host CPU 102. In addition, the buffer 126 may temporarily hold outgoing data symbols if the bus 104 is busy servicing another master, or if the DSP 106 is indicating that the buffers 132 are full and cannot accept any new symbols at the moment. The CPU 102 has input and output (I/O) access through the bus 104 via the bus interface 128.

Figure 2:
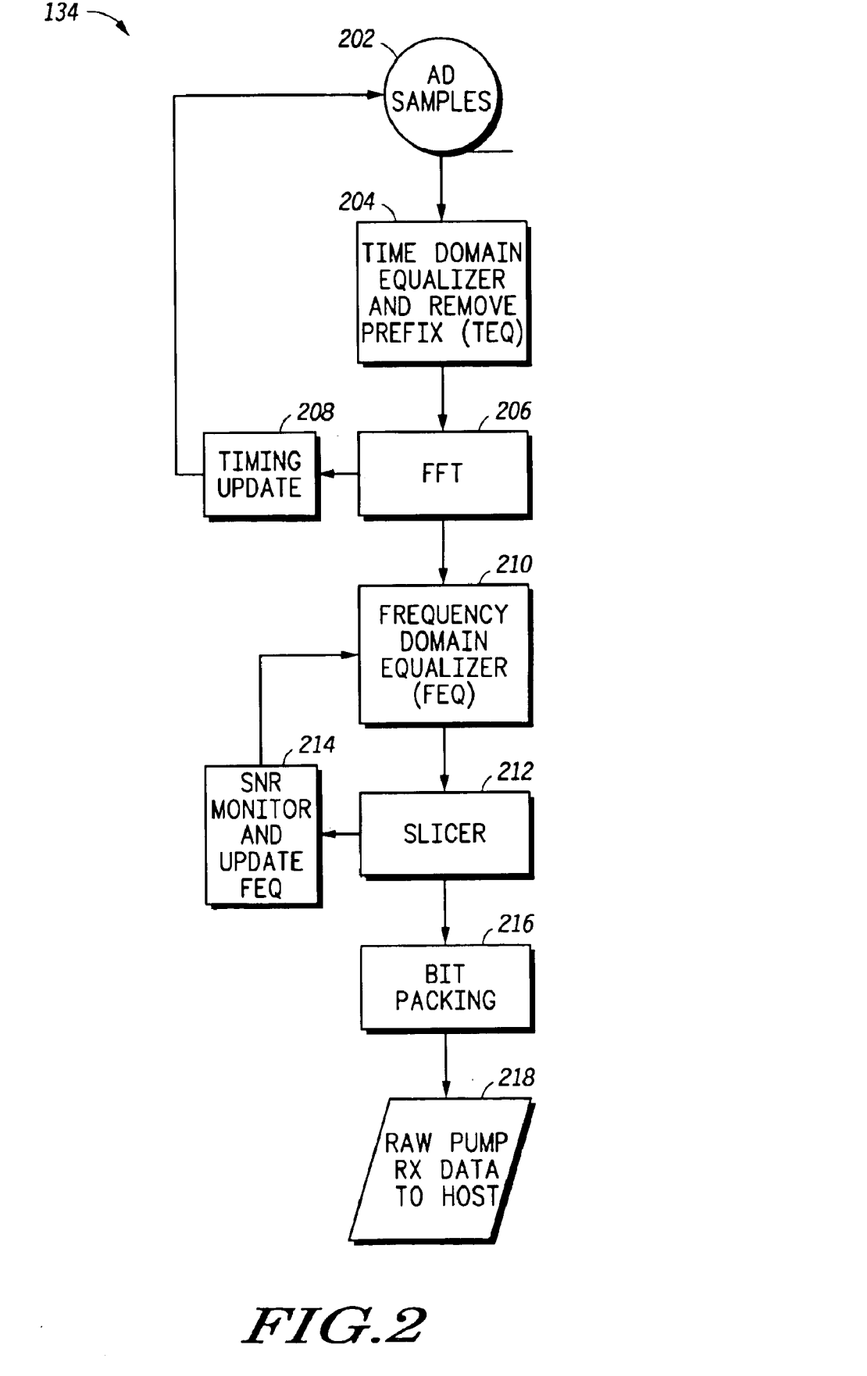
FIG. 2 illustrates, in a flowchart, the data pump receive data (RxD) operations that are performed by the DSP of FIG. 1.

FIG. 2 illustrates, in a flowchart, the operations performed by the xDSL pump 134 of FIG. 1. The input to the DSP 106 is a serial stream of digitized time domain data from the AFE circuitry 108 and 110 as shown via input 202 of FIG. 2. While an AFE circuit may be hardwired to perform TEQ operations, step 204 in FIG. 2 illustrates that the AFE TEQ operations may be shared with additional TEQ software processing in the DSP 106, or that the hardware TEQ processing by the AFE circuitry may be optionally replaced by full implementation of TEQ in the DSP via software. Additionally, the device may be configured so that software may dynamically switch the modem between an AFE TEQ implementation and a DSP TEQ implementation as the working environment requires. In addition, prefix information is removed by the DSP as illustrated in step 204.

After optional TEQ operations are performed by the DSP 106, the step 206 performs a discrete Fourier transform (DFT) or FFT on the time domain serial stream of digital data. The FFT accepts as input 256 digital samples of the received time domain ADSL analog symbol. The output of the FFT step 206 is 128 complex values representing the 128 different frequency bins of the received ADSL symbol. The timing update operation 208 is used to track the angle of a pilot tone in the serial stream of data to continue to maintain adequate alignment of the DSPs processing to the incoming symbols of data. Note that while the specifics given herein focus somewhat on G.lite specifics, the teachings of FIGS. 1–4 may be used in any xDSL, G.dmt, G.lite, or like solution.

After FFT processing via step 206, a step 210 is used to FEQ process the 128 complex outputs of step 206. In step 210, the DSP 106 corrects each of the 128 or more frequency bins for phase and amplitude distortion that was applied to the data while the data symbols were in transit across the communication line. After the adjustment in step 210, a step 212 is used to associate each of the complex values from the step 210 with a QAM point in a constellation. Each point on the constellation for each bin is associated with a different binary encoding so that each frequency bin in the symbol is converted from complex values to binary information of 1 to 15 bits for each bin. For example, four different signal amplitudes and four different signal phases allow for the encoding of four bits of information since there are 16 different combination of phase and magnitude in this constellation. The function of the slicer 212 is to determine which point on the constellation is closest to the referenced complex value. The signal to noise ratio (SNR) step 214 is used to update the FEQ step 210 so that correct slicing via step 212 continues for all symbols received over time.

It is the function of the bit formatter step 216 to assemble the bits of each bin into words for the Host as well as telling the Host how many bits are in each bin. Once an entire symbol is received and assembled by the step 218, it is provided by the DSP 106 over the bus 104 to the host CPU 102 for symbol-wide processing (see FIG. 3). The operations performed by the DSP in the transmit direction are analogous to the operation of FIG. 2 only in reverse. When transmitting data, the DSP 106 will first reformat the words from the Host into ADSL frequency bins. The one or more bits assigned to each bin will be QAM encoded, and then inverse FFT converted into a serial stream of digital information that is communicated to the AFE circuitry.

Figure 3:
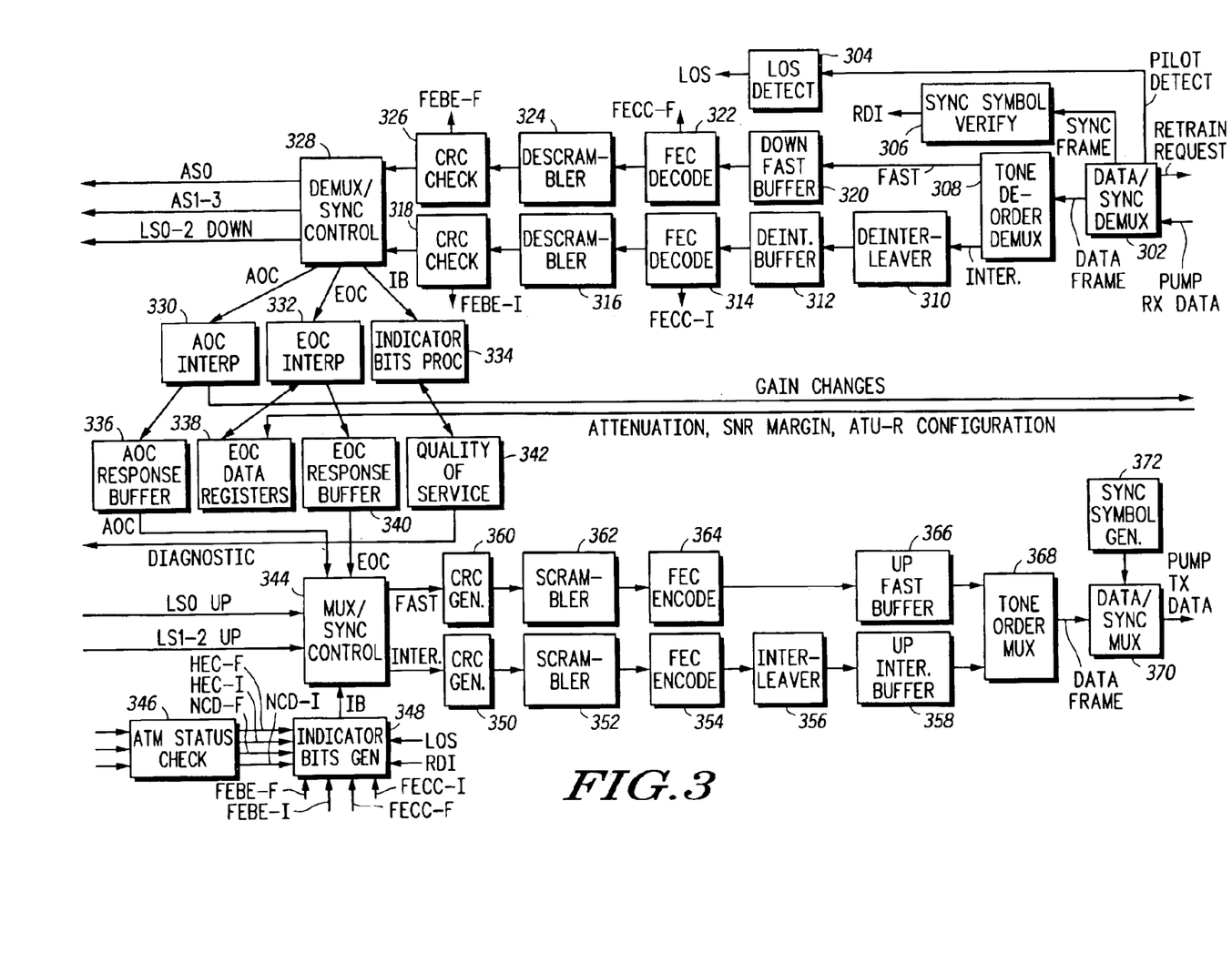
FIG. 3 illustrates, in a data flow diagram, the data pump operations that are performed by the host CPU within a personal computer (PC) of FIG. 1.

FIG. 3 illustrates the operations performed by the host CPU 102 via the step 124 of FIG. 1. In FIG. 3, pump receive (Rx) data is provided to a data/sync demultiplexer (deMUX) 302. The pump Rx data is the ADSL symbol data received, processed, and byte assembled by the DSP as per FIG. 2. In ADSL, each 69th symbol is a synchronization symbol that is analyzed to realign the receiver's algorithms to the incoming data stream. If the receiver ever detects a loss of the signal per step 304, the step 304 asserts the loss of signal (LOS) flag. In certain events where the communication channel experiences severe changes or when the data being received is severely out of sync, the step 302 may request that the receiver be retrained to improve performance via a retrain request. If synchronization is obtained or maintained via every $69^{th}$ symbol, the step 306 indicates this operational status by asserting the rdi control signal.

Once data is received and periodically synchronized by steps 302–306, the data frame or symbol is presented to a step 308. In full rate G.dmt ADSL, the logical order of the bits may be altered within the rank order of the frequency bins. In these cases, the step 308 is used to reorder the DSL frequency bins back into their correct logical sequence before further processing. In G.lite, as currently set forth in specifications, the DSL frequency bins or carriers are already in the correct order, so no bin reordering is necessary. Next, step 308 packs the bits from the DSL frequency bins in bytes. For full rate G.dmt ADSL, the bytes are split up into fast and interleave bytes. For G.lite, all the bytes are interleave bytes.

In full rate ADSL, the data may be provided in a fast manner or in an interleaved slower manner. In the fast path of steps 320326, the data for one symbol is not interleaved with data from other symbols so that data is present and available for processing by the host CPU 102 in one symbol's duration of processing time. In the slower interleaved path of steps 310–318, the data must be buffered until all of two or more interleaved symbols are received upon which the interleaved symbol data can then be reassembled into respective separate symbols (thus the presense of the buffers 312). Generally, severe noise events on a communciatoin channel occur in widely separated bursts where each burst is generally short in duration. By interleaving data from many different symbols, the commonly encountered short bursts of noise or interruptions on the line are spread across many symbols of data so that forward error correction (FEC) or Reed Solomon processing may be used to correct the error if made across several symbols. Generally, one byte being lost in sixteen different symbols is easier to correct than sixteen bytes being lost in one symbol. In fact, an error spread among several symbols may be correctable whereas the concentration of that error into a single symbol may render that symbol uncorrectable and therefore useless.

Therefore, if the fast path is used, the buffer 320 buffers the symbol for processing by the steps 322–326. An FEC Reed Solomon error code detection and correction step then performs error correction and detection on the symbol. If the symbol is received without errors, such is signaled via an fecc-f signal. In step 324, the bits of the symbol are descrambled. The bits of an ADSL symbol are scrambled by a linear feedback shift register (LFSR) state machine algorithm so that DC drift and other adverse phenomenon in a communication line are more likely to be avoided. This scrambling of the data upon transmission is removed from the data symbol in the receiver by a reverse LFSR operation in step 324. Finally, a CRC check is performed on the data to perform additional error detection on the data symbol. The success or failure of the CRC operation is reported via a signal febe-f. The demux and sync control step 328 is used to realign data from the fast path with data from the normal data path as necessary. Generally, the fast path is only present in a G.dmt system and is not present in the G.lite standard at this moment, therefore the method 328 may not be needed or implemented in G.lite systems.

Spread throughout various bits within data symbols are certain status or control bits. These bits or bit positions are tracked and accessed by state machines or counters so that an administrative overhead channel and an embedded operations channel may be used to provide data from a transmitter to a receiver. The steps 330–334 are used to detect, access, and historically track those bits within the stream of symbols via buffers 336–342. Various indicator bits 334 are used to communicate status and/or control information, such as the success or failure of FEC in a particular symbol and CRC check success or failure, between the transmitter and the receiver. These status or control bits allow the generation of quality of service (QOS) historical indicators and like diagnostic information (e.g., QOS counter 342 in FIG. 3).

Generally, the steps 344–372 are performing the receive operation of steps 302–328 in reverse in order to implement a transmitter portion of the CPU. The received information recorded via steps 336–342 is selectively inserted into the symbol stream via the MUX 344. The MUX 344 keeps track of ATM status and ATM indicator bits (see steps 120–122 of FIG. 1) via steps 346 and 348 of FIG. 3. Both a fast path 360–366 and normal data symbol path 350–358 are used in the transmit side of the host CPU 102 which are analogous to steps 310–326 executed in reverse. These paths perform the CRC generation, the bit scrambling via LFSR processing, the FEC RS error correction code generation, symbol data interleaving, buffering, and potentially other functions as were substantially discussed above for the receiver side of the host CPU 102. The tone order MUX 368 performs the tone ordering that was discussed as being reversed via a step 308 at the received end. The data sync MUX 370 along with the sync symbol generator 372 periodically inserts the sync symbol every $69^{th}$ symbol into the symbol stream. The data and the inserted sync symbol are sent out as the pump transmit (Tx) data in FIG. 3.

Note that there is a benefit for some or all of the routines of the ADSL stack driver 114 of FIG. 1 to be implemented on the DSP 106 and vice versa. For example, in today's highly integrated systems and/or parallel processing architectures, the host CPU may be operating in an environment where it has plenty of MIPS to devote to the processing of incoming V.90 or DMT data. In this same environment, the DSP 106 may be multi-processing and in dire need of additional bandwidth. Therefore, upon start-up or upon a configuration event, the redundant presence of one or all of the functions 130–136 in the CPU 102 and the redundant presence of the functions 118–128 in the DSP 106 is advantageous. A user can hardwire or software configure the host 102, via register bits or one or more computer instructions, to shift MIPS workload from the DSP to the host CPU and vice versa.

In addition, a system may be made wherein the CPU and/or the DSP dynamically monitor their MIPS requirements at all times and dynamically adjust their respective data pump processing workloads during a communication transaction. For example, an ADSL transmission may begin and transmit thousands or millions of cells using the configurations specifically set forth in FIGS. 2 and 3. It may then be determined via a workload measurement algorithm that is ongoing or periodic in function, that the host CPU 102 has additional requests that must be processed and are very time consuming where it would be advantageous to "off-load" some of the processing of the modem information from the host CPU to the DSP for at least some period of time. In this case, the CPU may dynamically assign the DSP to perform the steps 302–310 on the receive end and 366–372 on the transmit end for a period of time. For more freeing of host CPU bandwidth, the CPU may send more functionality such as the steps 302–326 and the steps 350–372 downstream to the DSP 106 to free up more CPU bandwidth for other functions. Finally, the CPU may completely end its involvement in the modem computations by instructing the DSP to begin to perform all of the operation of FIG. 3 within FIG. 2.

Such shifting of MIPS responsibility from one processor to another may be due to one processor entering one or more low power modes of operation such as a sleep mode or a halt mode. In one embodiment, the shifting of the bandwidth from the CPU to the DSP may require the DSP to temporarily demand that the communication bandwidth be reduced for a short period of time until the host CPU can once again commit more MIPS to modem data receipt and transmission. Such a system may be formed by functionally integrating the existing functionality of a soft modem, a passive modem, an active modem, or other existing modem constructs together into a single modem where only one of the constructs is enabled at any one time via dynamic software control. A modem that can dynamically adjust MIPS consumption between two different processors is advantageous in today's multi-tasking and dynamically networked processing.

Figure 4:
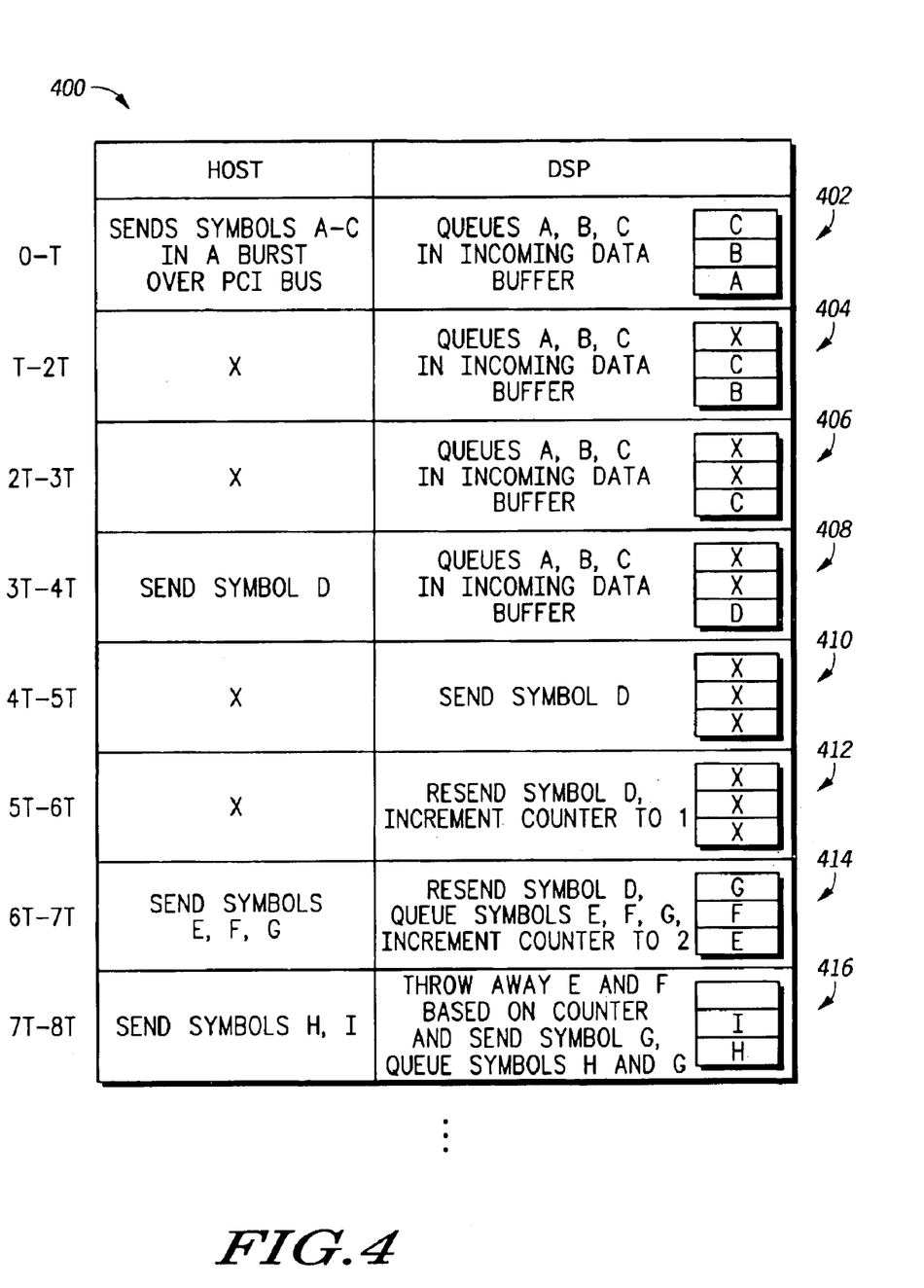
FIG. 4 illustrates, in a block flow diagram, a method for managing symbol buffering between the host CPU and the DSP during symbol processing.

FIG. 4 illustrates in a time-sequential flow diagram, a methodology used by the CPU 102 and a DSP 106 for handling data stream buffering between each other. This buffering is generally performed via the buffers 126 and 132 shown in FIG. 1. FIG. 4 contains eight rows of information. Each of the eight rows is representative of a different symbol time period (T) during the operating of system of FIG. 1. For example, in FIG. 4, the first row of FIG. 4 represents the first ADSL symbol time period of 0 to T seconds. The second row is representative of a time period of T to 2 T seconds. The other six rows of FIG. 4 continue sequentially on to represent incremental T second periods of time where it takes generally T seconds to communicate a single ADSL or G.lite data symbol. In addition, FIG. 4 contains two columns. The left-hand column indicates what the host CPU 102 is performing within the time period denoted for that row. The right-hand column of FIG. 4 indicates what functions the DSP 106 are performing within that same time period.

FIG. 4 illustrates a first time period of 0 to T seconds. In this time period the host CPU 102 is beginning a transfer of ADSL data over the analog communication line. To begin such a transfer, the host CPU 102 will transfer one or more ADSL symbols over the bus 104 to the DSP 106. Therefore, the left-hand column of FIG. 4 indicates that in this first time period the host sends three symbols A, B, and C in a burst fashion across the bus 104 to the DSP 106. The DSP 106 receives the symbols A–C and buffers them in a FIFO buffer as indicated in row 402 of FIG. 4. Therefore, the buffers 132, which are controlled by the DSP 106, are written to contain the symbol A, followed by the symbol B, and lastly followed by the last received symbol C in FIFO format. It is important to note that the buffers and all other memory accesses performed by the DSP 106 and the DSP 102 may be made to internal memory within the respective processors or may be made to common memory units coupled to the bus 104. In one form, the buffers, software, data tables, and all other information requiring memory are stored in common memory devices coupled to the bus 104. Both the CPU 102 and DSP 106 will these memory locations through bus transactions over the bus 104.

After the buffering of the symbols A, B, and C, the next T second time period 404 begins. In time period 404, the processor 102 is shown as being utilized in a manner unrelated to the transmission of ADSL data. Therefore, the host 102 is wholly occupied during time period 404 of FIG. 4 by performing other tasks other than analog modem data pump operations. However, this lack of attention by the CPU 102 does not affect DSP operations, and the DSP 106 can initiate and train an ADSL connection along the analog communication line. Once the ADSL connection is established, time period 404 illustrates that the symbol A is communicated across the analog communication line in the time period 404. The queue or FIFO buffer is adjusted to remove symbol A from the buffer and decrement B and C within the buffer to prioritize them for subsequent transmission.

Time period 406 of FIG. 4 once again indicates that the host CPU 102 is being used to perform other functions while the DSP 106 continues to send ADSL data. Time period 406 indicates that the symbol B is sent by the DSP along the analog communication line while the symbol C is increased in the transmission priority within the FIFO buffer.

Time period 408 of FIG. 4 indicates that the host processor returns at least some of its MIPS capability to the ADSL transmission. Therefore, the host processor 102 sends a new symbol D over the bus 104 to the DSP 106 in time period 408. In the same period 408, the DSP 106 is transmitting the ADSL symbol C and simultaneously queuing the currently received symbol D within the buffers.

Time period 410 shows that the CPU 102 is once again consumed performing other processing other than ADSL symbol provision. However, the DSP must continue to send ADSL symbols whereby the symbol D is transmitted in the time period 410. It is important to note that the input symbol buffer for the DSP 106 is now empty at the end of time period 410. Time period 412 indicates that the host CPU has still not resumed its transmission of ADSL symbols to the DSP, whereby the DSP 106 now has no symbols to transmit. Since ADSL requires continuous streams of data to be communicated between a received point and a transmit point, the DSP must communicate some information along the communication line or lose the ADSL connection. Even if the information being communicated isn't real time such as video or music, the closing of an ADSL channel followed by subsequent reopening of the channel and retraining will consume a significant amount of bandwidth that could be very undesirable to the parties engaged in the transmission. In order to prevent the loss of a real-time connection and in order to prevent such stall-and-reconnect latencies, the DSP 106 will resend the last symbol it processed when the buffers 132 of FIG. 1 are empty. Therefore, if a connection has been made, the transmission is not complete, and data is not being provided to the DSP fast enough to keep new symbol data in the buffer, then the DSP will transmit the last symbol it received as a redundant symbol. By transmitting a redundant symbol one or more times while data is not resident within the DSP buffers, the DSP 106 can maintain the analog communication line in its ADSL communication state without having to terminate the connection. Higher level protocols such as TCP/IP or ATM will be used to determine that redundant symbols D have been transmitted whereby these symbols will be discarded or processed in a manner that is appropriate for redundantly received symbols.

Time period 414 begins without the DSP 106 having any new data within the buffer. Since time period 412 begins without new symbols being present in the buffer, the symbol D is simply retransmitted again by the DSP 106 to maintain the ADSL connection. During transmission of this second redundant symbol D, the host CPU returns to ADSL symbol processing and provides symbols E, F, and G across the bus 104 to the DSP 106. Time period 414 indicates that these symbols E, F, and G and queued within the buffers 132 as shown. Note that time periods 412 and 414 show that the DSP maintains a redundant counter which counts the number of redundant symbols that are transmitted sequentially in order to maintain the ADSL connection in the absence of valid buffer data. Upon receipt and queuing of the information in step 414, two redundant symbols D have been transmitted to maintain the connection whereby the redundant symbol counter is equal to 2.

In time period 416, the DSP 106 attempts to remedy itself to its appropriate state. The appropriate state is the state the DSP would have been in had the redundant cells not have been transmitted and new symbols timely provided to the DSP. In other words, the DSP tries to place itself into the same state it would have been in had the CPU continued to timely provide data across the bus 104 to its buffers. In order to do this, the symbols E and F must be discarded so that transmission can continue with symbol G in time period 416. In other words, the counter in the DSP indicates that two redundant cells were transmitted, whereby two new ADSL symbols must be discarded to regain the proper state of the machine. Therefore, time period 416 of FIG. 4 indicates that the symbols E and F are discarded while the symbol G is transmitted on the analog communication line. In parallel to the discarding of E and F and the transmitting of symbol G, the host CPU 102 provides symbols H and I to the DSP 106. As indicated in timeframe 416 of FIG. 4, these symbols H and I are appropriately queued within the FIFO buffer of the DSP 106.

Since the symbols E and F were discarded, a real time connection that is communicating video and/or audio will simply experience a very short glitch in transmission that should be unnoticed by the user when the loss of data is very minimal. In a case where the system of FIG. 1 is transmitting a computer program, web page content, or some other non-real time content, upper levels of the communication protocol will recognize that symbols E and F have been lost. These protocols will request retransmission of the symbols E and F where such retransmission will be made by the CPU 102 and the DSP 106 at a later time. This retransmission will allow the receiving end to receive these symbols E and F and insert them in the proper data location at some later time during the transmission procedure. Therefore, FIG. 4 illustrates an improved buffering mechanism, which allows for retransmission of redundant symbols in order to maintain an ADSL connection. In order to correct for the transmission of redundant symbols, new symbols that are eventually received are discarded in order to return the machine to its proper state.

Although the present invention has been described with reference to a specific embodiment, further modifications and improvements will occur to those skilled in the art. It is to be understood, therefore, that the invention encompasses all such modifications that do not depart from the spirit and scope of the invention as defined in the appended claims.

What is claimed is:

1. A modem apparatus comprising:
   an analog interface for interfacing to a communication line;
   a digital signal processor coupled to the analog interface, the digital signal processor being coupled performs frequency domain equalization (FEQ) operations, time domain equalization (TEQ) operations, fast fourier transform (FFT) operations, inverse fast fourier transform (iFFT) operations, and encoding/decoding operations on a serial stream of data provided through the analog interface, the digital signal processor having an output;
   a data bus coupled to the output of the digital signal processor; and
   a host central processing unit (CPU) coupled to the data bus for receiving packets of data from the digital signal processor, the host CPU performing error correction operations on the data within the packets of data,
   wherein at least one operation performed by one of the digital signal processor and the host CPU can be dynamically reassigned to a different one of the digitial signal processor and the host CPU.

2. The modem apparatus of claim 1 wherein the host CPU also performs interleaving and/or deinterleaving operations to intermingle or separate two or more different data symbols.

3. The modem apparatus of claim 1 wherein the host CPU performs Reed Solomon encoding and/or decoding on the data within the data packets.

4. The modem apparatus of claim 3 wherein the host CPU performs cyclic redundancy check (CRC) operations on the data within the data packets.

5. The modem apparatus of claim 1 wherein the host CPU performs tone ordering and/or deordering on the data within the data packets.

6. The modem apparatus of claim 1 wherein the host CPU configures and processes ATM data for transmission within DMT data packets.

7. The modem apparatus of claim 1 wherein the digital signal processor performs QAM encoding and/or decoding operations.

8. A method for processing, the method comprising the steps of:
   receiving a serial stream of data via a first processor;
   performing time domain to frequency domain operations on serial stream of data to create digital values via the first processor;
   performing frequency domain equalization on the digital values via the first processor;
   decoding the digital values to a binary stream that is packaged into byte/word boundaries of the first processor;
   providing the binary stream to a second processor;
   deinterleaving data within the binary sream via the second processor; and
   error code correcting and/or CRC processing the binary stream via the second processor,
   wherein at least one step performed by one of the first and second processors can be dynamically reassigned to a different one of the first and second processors.

9. The method of claim 8 wherein the first processor ATM processes the binary stream to extract data from ATM cells.

10. The method of claim 9 wherein the first processor processes the binary stream to extract data from TCP/IP packets.

11. The method of claim 8 wherein both the first and second processors control buffers that are used to buffer the binary stream between the first processor and the second processor.

12. The method of claim 8 wherein steps performed by the first processor can be dynamically switched over to the second processor.

13. The method of claim 8 wherein steps performed by the second processor can be dynamically switched over to the first processor.

14. The method of claim 8 wherein processing in the second processor is involved only after a certain amount of the binary stream is provided from the second processor to the first processor.

* * * * *